United States Patent
Lee et al.

(10) Patent No.: US 9,391,746 B2
(45) Date of Patent: Jul. 12, 2016

(54) APPARATUS AND METHOD FOR TRANSMITTING UL FEEDBACK INFORMATION FOR CARRIER OVER A UL FEEDBACK CHANNEL IN A MULTICARRIER SYSTEM

(75) Inventors: Eunjong Lee, Anyang-si (KR); Youngsoo Yuk, Anyang-si (KR); Kiseon Ryu, Anyang-si (KR); Jinyoung Chun, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 301 days.

(21) Appl. No.: 13/580,806

(22) PCT Filed: Feb. 24, 2011

(86) PCT No.: PCT/KR2011/001308
§ 371 (c)(1),
(2), (4) Date: Aug. 23, 2012

(87) PCT Pub. No.: WO2011/105840
PCT Pub. Date: Sep. 1, 2011

(65) Prior Publication Data
US 2012/0314679 A1    Dec. 13, 2012

Related U.S. Application Data

(60) Provisional application No. 61/307,455, filed on Feb. 24, 2010, provisional application No. 61/308,313, filed on Feb. 26, 2010.

(30) Foreign Application Priority Data

Feb. 10, 2011    (KR) .................. 10-2011-0012046

(51) Int. Cl.
*H04L 5/00* (2006.01)

(52) U.S. Cl.
CPC ............. *H04L 5/001* (2013.01); *H04L 5/0053* (2013.01); *H04L 5/0055* (2013.01); *H04L 5/0094* (2013.01); *H04L 5/0098* (2013.01)

(58) Field of Classification Search
None
See application file for complete search history.

(56) References Cited

U.S. PATENT DOCUMENTS

2006/0221894 A1    10/2006  Casaccia et al.
2008/0159248 A1    7/2008   Li
(Continued)

FOREIGN PATENT DOCUMENTS

CN    101547477    9/2009
CN    101600245    12/2009
(Continued)

OTHER PUBLICATIONS

Fu et al, Project, IEEE 802.16 Broadband Wireless Access Working Group, Multi-Carrier DG Harmonized Text Proposal-carrier management/PHY, Jul. 14, 2009, Multi-Carrier DG Chairs, hereinafter known as Fu.*
(Continued)

*Primary Examiner* — Hassan Phillips
*Assistant Examiner* — Gautam Sharma
(74) *Attorney, Agent, or Firm* — Lee, Hong, Degerman, Kang & Waimey; Jonathan Kang; Richard Salfelder

(57) ABSTRACT

Disclosed herein is a method for transmitting feedback information on the downlink of a carrier to a base station in a multicarrier system, and the method may include receiving a first message including uplink feedback allocation information from the base station through a secondary carrier, and transmitting uplink feedback information on the secondary carrier to the base station over an assigned uplink feedback channel of a primary carrier when the secondary carrier is a downlink only activated carrier.

10 Claims, 5 Drawing Sheets

(56) References Cited

U.S. PATENT DOCUMENTS

| | | | |
|---|---|---|---|
| 2008/0287068 A1* | 11/2008 | Etemad | 455/68 |
| 2009/0257387 A1* | 10/2009 | Gholmieh et al. | 370/329 |
| 2009/0316575 A1* | 12/2009 | Gholmieh et al. | 370/225 |
| 2010/0118746 A1* | 5/2010 | Gerlach | 370/281 |
| 2010/0130137 A1* | 5/2010 | Pelletier et al. | 455/68 |
| 2010/0234037 A1* | 9/2010 | Terry et al. | 455/450 |
| 2010/0238986 A1* | 9/2010 | Gholmieh et al. | 375/220 |
| 2010/0272047 A1* | 10/2010 | Zhu et al. | 370/329 |
| 2011/0051669 A1* | 3/2011 | Wang et al. | 370/328 |
| 2011/0103323 A1* | 5/2011 | Wang et al. | 370/329 |
| 2011/0176435 A1* | 7/2011 | Khandekar et al. | 370/252 |
| 2011/0199945 A1* | 8/2011 | Chang et al. | 370/281 |
| 2011/0199990 A1* | 8/2011 | Chang et al. | 370/329 |
| 2011/0243264 A1* | 10/2011 | Hultell et al. | 375/260 |
| 2012/0099439 A1* | 4/2012 | Baldemair et al. | 370/241 |
| 2012/0327910 A1* | 12/2012 | Dalsgaard et al. | 370/335 |

FOREIGN PATENT DOCUMENTS

| | | |
|---|---|---|
| CN | 101615992 | 12/2009 |
| CN | 101635961 | 1/2010 |
| JP | 2008-539667 | 11/2008 |
| JP | 2009-153160 | 7/2009 |
| JP | 2011-515056 | 5/2011 |
| JP | 2011-528212 | 11/2011 |
| KR | 10-2010-0009493 | 1/2010 |
| KR | 10-2010-0035578 | 4/2010 |
| WO | 2009/112928 | 9/2009 |
| WO | 2010/008228 | 1/2010 |
| WO | 2010/051514 | 5/2010 |

OTHER PUBLICATIONS

Kim et al, Project IEEE 802.16 Broadband Wireless Access Working Group, Reply comments on recommended AWD Text Proposal of Multi-Carrier DG [AWD-MCDG], Jul. 12, 2009, ETRI.*

Korean Intellectual Property Office Application Serial No. 10-2011-0012046, Notice of Allowance dated Apr. 4, 2013, 3 pages.

The State Intellectual Property Office of the People's Republic of China Application Serial No. 201180010788.9, Office Action dated Aug. 21, 2014, 5 pages.

* cited by examiner (a)

(b)

(a)

(b)

(a)

(B)

APPARATUS AND METHOD FOR TRANSMITTING UL FEEDBACK INFORMATION FOR CARRIER OVER A UL FEEDBACK CHANNEL IN A MULTICARRIER SYSTEM

TECHNICAL FIELD

The present disclosure relates to a multicarrier system, and more particularly, to a method and apparatus for transmitting feedback information on the downlink of a secondary carrier through an uplink feedback channel.

BACKGROUND ART

Hereinafter, a carrier will be described in brief.

The user may have information for which modulation manipulation on the amplitude, frequency and/or phase of a sine wave or periodic pulse wave is performed to be transmitted. At this time, the sine wave or pulse wave performing the role of carrying information may be referred to as a carrier.

The scheme of modulating a carrier may include a single-carrier modulation (SCM) scheme and a multi-carrier modulation (MCM) scheme. Of them, the single-carrier modulation scheme is a modulation method of loading all information on a carrier to modulate them.

The multi-carrier modulation scheme refers to a technology in which an entire bandwidth channel of one carrier is divided into sub-channels having several small bandwidths and multiple narrowband sub-carriers are transmitted in a multiplexed manner through each sub-channel.

At this time, when using a multi-carrier modulation (MCM) scheme, each sub-channel may be approximated to a flat characteristic (flat channel) due to its small bandwidth. Furthermore, the user may compensate the distortion of the channel using a simple equalizer. Furthermore, the multi-carrier modulation scheme enables high-speed implementation using fast Fourier transformation (FFT). In other words, it may be advantageous in high-speed data transmission compared to the single-carrier modulation scheme.

As the performance of the base station and/or terminal is developed, the range of the frequency bandwidth provided or used by the base station and/or terminal is expanded. Therefore, according to an embodiment of the present disclosure, there is disclosed a multicarrier system for supporting broadband by aggregating one or more carriers.

In other words, the multicarrier system to be described below illustrates a case where one or more carriers are aggregated to be used, contrary to the multi-carrier modulation scheme in which one carrier is divided to be used as described above.

The technology of managing several carriers (for example, several frequency carriers (FCs)) with one medium access control (MAC) entity has been proposed to effectively use multi-band (or multi-carrier).

FIGS. 1A and 1B are views illustrating a multi-band radio frequency (RF) based signal transmission and reception method.

In FIG. 1, one medium access control layer at the transmission and reception ends can manage several carriers to effectively use a multicarrier. At this time, in order to effectively transmit and receive a multicarrier, it is assumed that both the transmission and reception ends can transmit and receive a multicarrier. At this time, frequency carriers (FCs) managed by one medium access control layer are not required to be contiguous to one another, and thus it has flexibility in the aspect of resource management. In other words, both contiguous aggregation and non-contiguous aggregation may be allowed.

According to FIGS. 1A and 1B, physical layer (PHY) 0, physical layer 1, . . . , physical layer n-2, physical layer n-1 represents a multi-band according to the present technology, and each band may have a frequency carrier (FC) size assigned to a specific service according to the predefined frequency policy. For example, physical layer 0 (RF carrier 0) may have the size of frequency band assigned to typical FM radio broadcast, and physical layer 1 (RF carrier 1) may have the size of frequency band assigned to mobile phone communication.

Though each frequency band may have a different frequency band size according to each frequency band characteristic as described above, for the sake of convenience of explanation, it is assumed in the following description that each frequency carrier (FC) has an "A" [MHz] size. Furthermore, each frequency allocation band may be represented as a carrier frequency for using a baseband signal at each frequency band, and thus hereinafter, each frequency allocation band will be referred to as a "carrier frequency band" or simply a "carrier" representing each carrier frequency band unless confused.

In addition, the aforementioned carrier may be referred to as a "component carrier" to distinguish it from a subcarrier, which is used in a multicarrier scheme as in a recent 3GPP LTE-A.

From this point of view, the foregoing "multi-band" scheme may be referred to as a "multi carrier" scheme or "carrier aggregation" scheme.

FIG. 2 is a view illustrating an example of the type in which multi carrier is used in a typical wireless communication system.

Referring to FIG. 2A, multi carrier in a typical technology may be a contiguous carrier aggregation, or may be non-contiguous carrier aggregation as illustrated in FIG. 2B. The unit for combining such carriers is a base bandwidth unit of a legacy system (e.g., LTE in case of a Long Term Evolution (LTE) Advanced system, and IEEE 802.16e in case of an IEEE 802.16m system), which is a typical technology.

In the multicarrier environment with a typical technology, there are defined two types of carriers as follows.

First, a first carrier (or primary carrier) refers to a carrier for performing the traffic of the terminal and base station, and the exchange of full physical layer and medium access control layer (PHY/MAC) control information. Furthermore, the primary carrier may be used for a typical operation of the terminal such as network entry. Each terminal has one primary carrier in a cell.

Furthermore, a second carrier (or secondary carrier) refers to a carrier that can be typically used for the exchange of traffic according to a base station specific allocation command and rule received from the first carrier. The second carrier may include control signalling for supporting a multicarrier operation.

In a typical technology, carriers in a multicarrier system may be divided into a fully configured carrier and a partially configured carrier based on the foregoing primary and secondary carrier.

The fully configured carrier refers to a carrier in which control signalling is configured. Furthermore, the information and parameters for multicarrier management and other carriers may be included in the control channels.

The partially configured carrier refers to a carrier in which all control channels for supporting downlink transmission in a downlink carrier with no uplink carrier constituting a pair in a time division duplex downlink (TDD DL) transmission or frequency division duplex (FDD) mode are configured.

Typically, the terminal may perform initial network entry through a primary carrier, and may exchange information on multicarrier capability to each other in the registration process by exchanging registration request/response (AAI_REG-REQ/RSP) messages with the base station.

In an MC operation in the current related art, the definition for a feedback channel allocation (HARQ ACK/NACK, CINR) method for an activated DL carrier is not defined.

In case of a carrier for which both DL/UL are in an active state, if a UL fastfeedback channel is assigned thereto through feedback allocation A-MAP IE transmitted to the DL A-MAP of the corresponding carrier, then the relevant feedback information can be transmitted through a UL feedback channel of the corresponding carrier. However, DL only activation is possible for the secondary carrier of an MC operation defined in the current standard such as IEEE 802.16m, and as a result, a UL control channel cannot be used in case of a DL only activated carrier.

Thus, when the terminal in a multicarrier mode (e.g., Basic MC mode, carrier aggregation mode, carrier switching mode) transmits and receives data through a DL only activated carrier, the standard such as IEEE 802.16m requires definition on whether a feedback channel for transmitting UL feedback information (e.g., CQI feedback, MIMO feedback, HARQ ACK/NACK feedback, or the like) should be assigned to which carrier's UL control channel.

In addition, when secondary carrier(s) assigned by the base station at the time of network (re)entry of the terminal has a different coverage, the corresponding carrier has a smaller coverage than that of the existing activated carrier if the base station unaware of the channel state of inactive carrier(s) indicates that any inactive carrier is to be activated, and the activation of the carrier may be failed if the terminal is not located in the coverage.

Due to this reason, feedback to a DL carrier such as CINR OR CQI to any secondary carrier is required to be transmitted to a particular inactive carrier as well as an active carrier.

DISCLOSURE OF INVENTION

Solution to Problem

The objective of the present disclosure is to provide a method of transmitting the uplink feedback information of a downlink only activated secondary carrier through an uplink feedback information of the primary carrier in a multicarrier system.

Furthermore, the objective of the present disclosure is to provide a method of transmitting the uplink feedback information of a downlink only activated secondary carrier using a carrier indication field of the Feedback Allocation A-MAP IE.

In addition, the objective of the present disclosure is to provide a method of transmitting the uplink feedback information of a downlink only activated secondary carrier through a feedback carrier index field.

According to the present disclosure, there is disclosed a method for transmitting feedback information on the downlink of a carrier to the base station in a multicarrier system, and the method may include receiving a first message comprising the uplink feedback allocation information from the base station through a secondary carrier; and transmitting uplink feedback information on the secondary carrier to the base station over an assigned uplink feedback channel of a primary carrier when the secondary carrier is a downlink only activated carrier.

Furthermore, it is characterized by further including receiving a carrier management command message including activation information indicating that the downlink of the secondary carrier is only activated from the base station through the primary carrier; and activating only the downlink of the secondary carrier according to the activation information.

Furthermore, it is characterized in that the activation information may be information indicating the activation of a secondary carrier, and indicating that the downlink of the secondary carrier is activated but the uplink thereof is not activated.

Furthermore, it is characterized in that the activation information may be information indicating the deactivation of a secondary carrier, and indicating that the uplink of the secondary carrier is deactivated but the downlink thereof is not deactivated.

Furthermore, it is characterized in that one uplink feedback channel may be assigned to each secondary carrier for the assigned uplink feedback channel of the primary carrier.

Furthermore, it is characterized in that the uplink feedback channel of the primary carrier may be located at an uplink region defined in a superframe header transmitted through the primary carrier.

Furthermore, it is characterized in that the first message may be a feedback allocation a-map information element (A-MAP IE).

Furthermore, it is characterized in that the secondary carrier may be a fully configured carrier.

Furthermore, it is characterized in that feedback information on the secondary carrier may be a response to a hybrid automatic repeat request (HARQ ACK/NACK) or a carrier to interference-and-noise ratio (CINR) for the secondary carrier.

Furthermore, it is characterized by further including transmitting a carrier management indication message indicating that activation for the downlink of the secondary carrier has been prepared as a response to the received carrier management command message to the base station through the primary carrier.

Furthermore, it is characterized in that the uplink feedback allocation information may include a feedback channel index, and the feedback channel index is an allocation for the uplink feedback channel of the primary carrier.

In addition, according to the present disclosure, there is disclosed a terminal for transmitting feedback information on the downlink of a carrier to the base station in a multicarrier system, and the terminal may include a memory; a radio frequency unit configured to transmit and/or receive radio signals to and/or from the outside; and a controller configured to control the radio frequency unit to receive a first message comprising uplink feedback allocation information from the base station through a secondary carrier, and control the radio frequency unit to transmit uplink feedback information on the secondary carrier to the base station through an assigned uplink feedback channel of a primary carrier when the secondary carrier is a downlink only activated carrier.

Furthermore, it is characterized in that the controller may control the radio frequency unit to receive a carrier management command message comprising activation information indicating that the downlink of the secondary carrier is only activated from the base station through the primary carrier, and control to activate only the downlink of the secondary carrier according to the activation information.

Furthermore, it is characterized in that the controller may control the radio frequency unit to transmit a carrier management indication message indicating that activation for the downlink of the secondary carrier has been prepared as a response to the received carrier management command message to the base station through the primary carrier.

According to the present disclosure, a feedback carrier index is transmitted only in case of a DL only activated carrier in a multicarrier system, thereby having the effect of using the existing feedback channel allocation process as it is.

Furthermore, it may be possible to map a UL carrier with minimized signalling overhead, and moreover, it may be effective in the load balancing of a UL feedback channel that is likely to be transmitted over only a primary carrier in case of a DL only activated carrier.

In addition, according to the present disclosure, the base station does not indicate activation for an inactive carrier having a smaller coverage than that of the existing activated carrier by allowing a DL CINR report for the inactive carrier, thereby preventing the activation failure of the carrier.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
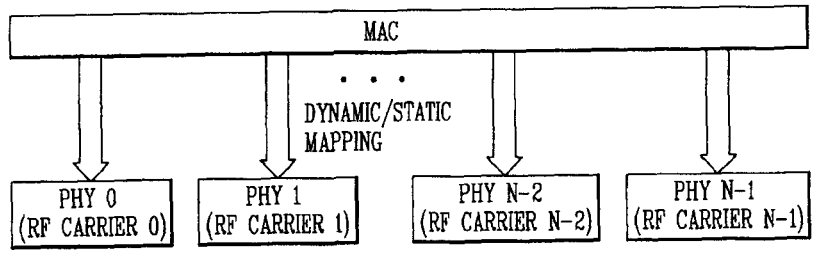
FIGS. 1A and 1B are views for explaining a multi-band radio frequency (RF)-based signal transmission and reception method.
Figure 1:
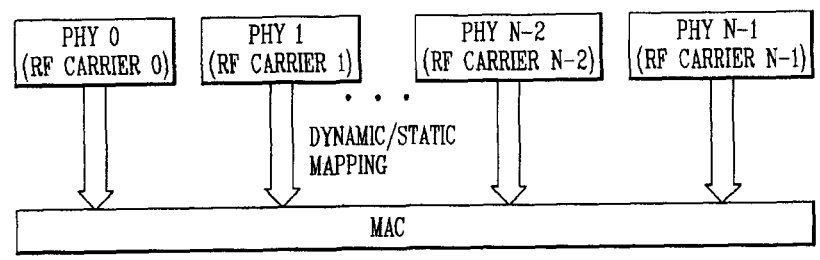
Figure 2:
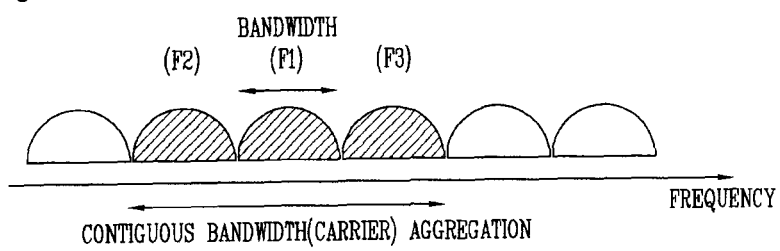
FIG. 2A is a view illustrating a contiguous carrier aggregation type in a typical wireless communication system.
FIG. 2B is a view illustrating a non-contiguous carrier aggregation type in a typical wireless communication system.
Figure 2:
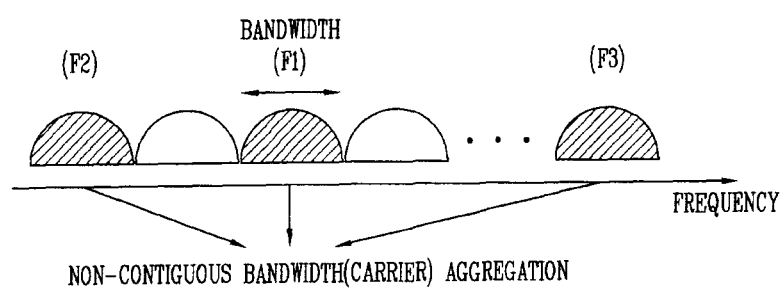

Hereinafter, embodiments according to the present disclosure will be described in detail with reference to the accompanying drawings. In the following description, it should be noted that only a portion required to understand the operation according to the present disclosure will be described, and the description of the remaining portion will be omitted in order not to obscure the gist of the present disclosure.

In the following embodiments, the constituent elements and features of the present disclosure are combined with one another in a predetermined form. Each constituent element or feature thereof should be considered to be selective as unless otherwise particularly specified. Each constituent element or feature thereof may be implemented in the form of not being combined with any other constituent elements or features. Furthermore, an embodiment of the present disclosure may be also configured by combining some of the constituent elements and/or features. The sequence of the operations described in the embodiments of the present disclosure may be changed. Some of the configurations or features of any embodiment may be included in any other embodiments, or may be replaced with the configurations and features corresponding to the any other embodiments.

Embodiments of the present disclosure are described mainly in relation to the transmission and reception of data between a base station and a terminal. Here, the base station has also the meaning of a terminal node of a network, which directly performs communication with the terminal. In this disclosure, a specific operation described to be performed by a base station may be carried out by an upper node of the base station if necessary.

In other words, it should be understood that various operations carried out for communication with a terminal in a network comprised of a plurality of network nodes including a base station can be carried out by the base station or other network nodes except the base station. The term "base station" may be replaced by a term such as fixed station, Node B, eNode B (eNB), access point, or the like. Furthermore, the term "terminal" may be replaced by a term such as UE (user equipment), MS (mobile station), MSS (mobile subscriber station), or the like.

Embodiments of the present disclosure may be implemented through various means. For example, embodiments of the present disclosure may be implemented by hardware, firmware, software, or any combination thereof.

In case of a hardware implementation, a method according to the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In case of a firmware or software implementation, a method according to the embodiments of the present disclosure may be implemented in the form of a module, procedure, function, or the like, which performs the functions or operations as described above. The software codes may be stored in a memory unit to be driven by a processor. The memory unit may be located at an inner or outer portion of the processor to send and/or receive data to and/or from the processor by various publicly-known means.

Specific terms used herein are provided to help understanding of the present disclosure, and the use of those specific terms may be replaced with other terms without departing from the technical spirit of the present disclosure.

Multicarrier Operation Modes

1. Multicarrier Aggregation

Multicarrier aggregation refers to a multicarrier mode for maintaining the physical layer connection of a terminal and monitoring control signalling through a primary carrier while the terminal performs data transmission through a secondary carrier.

2. Multicarrier Switching

Multicarrier switching refers to a multicarrier mode for switching the physical layer connection of a terminal on a partially configured or fully configured secondary carrier over a primary carrier by the indication of the base station to receive an E-MBS service through a secondary carrier.

3. Basic MC Mode

Basic multicarrier (MC) mode refers to a mode being operated only on a single carrier, though the terminal supports a primary carrier change process as well as the optimized scanning of carriers associated with a multicarrier operation.

Hereinafter, the terms that can be used in a multicarrier operation will be defined.

1. Available carrier: Available carrier means all carriers belong to the base station (ABS). The terminal may acquire information on available carriers through a global carrier configuration (AAI_Global-config) message or multicarrier advertisement (AAI_MC-ADV) message.

2. Assigned carrier: Assigned carrier means a subset of available carriers assigned to a terminal by the base station according to the capability of the terminal. In other words, the base station may assign at least one of its available carriers to the assigned secondary carriers of the terminal by taking the capability of the terminal into consideration.

3. Active carrier: Active carrier means a carrier prepared to actually exchange data between the terminal and the base station, and may be a subset of assigned carriers. The activation/deactivation of an assigned secondary carrier may be determined by the base station based on its quality of service (QoS) requirement. The base station may instruct the activation or deactivation of a specific secondary carrier to the terminal through a carrier management (operation) command (AAI_CM-CMD) message.

Based on the foregoing definition, hereinafter, the procedure of allowing the base station to assign a carrier to the terminal will be described with reference to FIG. 3.

Figure 3:
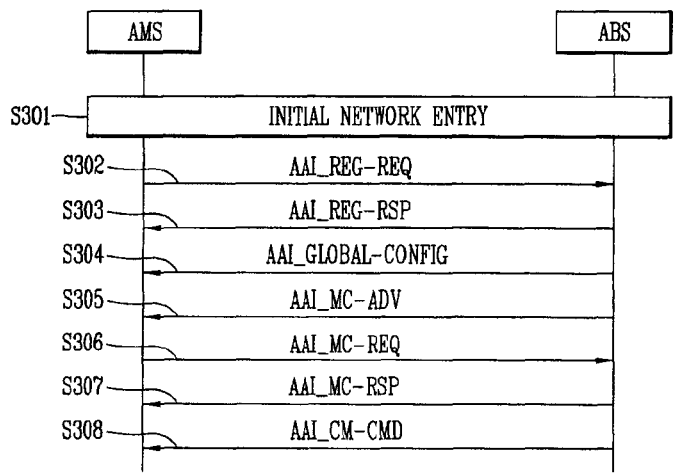
FIG. 3 is a view for explaining an example of the procedure for allowing the base station to assign one or more carriers to the terminal through a carrier management (operation) command (AAI_CM-CMD) message in a broadband wireless access system.

FIG. 3 is a view for explaining an example of the procedure for allowing the base station to assign one or more carriers to the terminal through a carrier management (operation) (AAI_CM-CMD) message in a broadband wireless access system.

Referring to FIG. 3, the terminal (AMS) performs an initial network entry procedure including the processes of scanning, ranging, and the like, with the base station (ABS) (S301).

The terminal and the base station may exchange information on mutual multicarrier capability through a registration request/response (AAI_REG-REQ/RSP) message (S302, S303).

The base station may transmit an AAI_REG-RSP message and then transmit a global carrier configuration (AAI_Global-config) message (S304).

The global carrier configuration message may include information on all available carriers supported by a network.

Furthermore, the terminal may receive a multicarrier advertisement (AAI_MC-ADV) message periodically broadcasted from the base station to acquire information on the multicarrier configuration of the base station.

Then, the terminal may request a list of assigned carriers to the base station with a method of notifying information on AMS's supportable carriers according to the multicarrier configurations of available carriers of the base station using the acquired information to the base station through a multicarrier request (AAI_MC-REQ) message (S306).

The base station may determine a subset to be assigned to a secondary carrier of the terminal from its own available carriers based on the information received from the terminal to determine an assigned carrier list, and notify it to the terminal through a multicarrier response (AAI_MC-RSP) message (S307).

Then, the base station may instruct the activation or deactivation of an assigned carrier allocated to the terminal through a carrier management (operation) command (AAI_CM-CMD) message according to the judgment based on its quality of service (QoS) requirement (S308).

Secondary Carrier Activation/Deactivation

The activation or deactivation of a secondary carrier is determined based on its QoS requirement, load condition of carriers, and other elements.

The base station activates or deactivates a secondary carrier using an AAI_CM-CMD MAC control message.

The base station transmits an AAI_CM-CMD MAC control message to the terminal through a primary carrier. The AAI_CM-CMD MAC control message may include information as follows.

(1) Indication type per DL/UL: activation, deactivation
(2) Secondary carrier list: referred by logical carrier index
(3) Ranging indicator for the activated carrier The base station transmits a carrier management command (CM-CMD) message having a polling set to "1" in MCEH to the terminal. Upon receiving the carrier management command message, the terminal transmits an AAI_MSG-ACK message or a message ACK extended header (EH) to the base station to notify that the carrier management command message has been successfully received.

The terminal transmits a carrier indication (CM-IND) message through a primary carrier. The carrier indication message checks whether the terminal has successfully activated or deactivated carriers included in the carrier management command message.

If activated, then the terminal transmits a carrier indication message to the base station when the UL/DL of a newly activated carrier has been prepared to transmit data traffic.

If the terminal performs the activation of a secondary carrier while the terminal supports data transmission through both the primary carrier and secondary carrier with one radio transceiver, then the terminal reconfigures the hardware configuration (for example, RF central frequency) of the terminal.

The terminal notifies that the preparation for a new carrier has been prepared by transmitting a carrier indication message to the base station after competing the hardware reconfiguration and synchronization for a new carrier. Furthermore, the terminal restarts communication with the base station.

After the base station receives a carrier indication message from the terminal, the base station can start data transmission through a secondary carrier.

DL CINR Report Method

1. DL CINR Report in a Single Carrier Environment

The base station assigns a UL fastfeedback channel to be used by the relevant terminal through FastFeedback IE in DL A-MAP.

When a UL fastfeedback channel has been assigned to the terminal by the base station, the terminal can report CQI for a DL carrier periodically or in an event-triggered type through the assigned UL fastfeedback channel.

Because a CQI report from the terminal may be used for the base station to effectively transmit DL data to the terminal, the base station may receive the CQI report from the terminal prior to starting data transmission.

At this time, since the terminal transmits a CQI report through UL, CQICH should be assigned to the terminal from the base station to allow the base station to receive the CQI report.

In order to receive DL CQI of the corresponding carrier in a single carrier system, the base station assigns a UL fastfeedback channel of the corresponding carrier to the terminal, and configures its duration and period, thereby allowing the terminal to periodically report channel quality information (CQI) to the base station.

2. DL CINR Report Operation in a Multi Carrier Environment

The base station assigns fastfeedback channels to each carrier of the terminal.

When a fastfeedback channel is assigned to the terminal for each carrier, the terminal reports CINR for a carrier through the assigned fastfeedback channel of the corresponding carrier.

The base station may instruct the terminal to report CINR values of active carriers through a fastfeedback channel of the primary carrier in a feedback region as defined in the single carrier section.

When measurement/report messages are used for a DL CINR report operation, the measurement/report messages are transmitted through a primary carrier of the terminal.

The measurement/report messages may include a CINR report for all carriers or each carrier of the terminal.

Feedback Allocation A-MAP IE

Feedback Allocation A-MAP IE may include information for assigning a feedback channel to a specific carrier. When a feedback channel is assigned to an deactivated carrier among assigned carriers even if an explicitly activated target carrier is not indicated, the terminal may recognize it implicitly as carrier activation indication.

Furthermore, Feedback Allocation A-MAP IE refers to a map information element used for the terminal to dynamically assign UL fastfeedback control channels (including both PFBCH and SFBCH) or release the allocation.

If the terminal has a fastfeedback control channel for an active DL carrier, and a new feedback channel is assigned to the same active DL carrier, then the existing fast-feedback channel is automatically released from the allocation.

Hereinafter, fields included in Feedback Allocation A-MAP IE will be described in brief.

Channel index: The terminal properly checks a fastfeedback channel capable of transmitting fast feedback information. Due to the allocation, it will be established one to one relationship between the channel index and the terminal.

ACK allocation flag: The base station sets an ACK allocation flag to "0b1" when the allocation period is set to "0b000", and the channel index of a newly assigned FFBCH is similar to the channel index of allocation-released FFBCH.

Short-term feedback period (p): Short-term feedback is transmitted for every 2 p frame through FFBCH.

Long-term feedback period (q): Long-term feedback is transmitted for every 2 q short-term feedback opportunity through FFBCH.

Allocation duration (d): FFBCH is transmitted for 8*2 d frames through FFBCH channels indexed by a channel index.

If d=0b000, then FFBCH is allocation-released. If d=0b111, then the terminal will report feedback information to the base station until the base station sends a suspend command to the terminal.

MFM: MIMO feedback mode

Feedback format: Feedback format implements a feedback format index when FFBCH reports fast feedback information.

FPI: FPI refers to a frequency portion in which a short term period report is to be measured by the terminal. FPI will not be included when FPCT=1.

Carrier Management Command (AAI CM-CMD) Message

As described above, the base station may instruct the activation of a secondary carrier to the terminal through a carrier management (operation) command (AAI_CM-CMD) message. The message may include a field indicating a carrier management type, namely, an action code field, thereby instructing the terminal as to whether an indication through the relevant message is the activation/deactivation of a secondary carrier or the change of a primary carrier.

At this time, if the scanning of an assigned carrier is carried out with the foregoing method to perform a scan report before the base station transmits an AAI_CM-CMD message to the terminal for carrier activation, then the base station may newly select a suitable carrier for activation with reference to the scanning result to transmit the result to the terminal by reflecting it on the AAI_CM-CMD message.

Hereinafter, parameters included in an AAI_CM-CMD message will be described in brief.

Indication type: Indicate activation or deactivation.

Target carrier index: Indicate a physical or logical carrier index of the target carrier to be activated through the relevant message.

Activation deadline: Indicate a timing (or critical timing) at which the terminal can transmit a message for checking the activation complete of a carrier for which its activation is indicated through the relevant message subsequent to transmitting an AAI_CM-CMD message to the terminal.

At this time, the message for checking activation complete (CM ACK) is a concept that is distinguished from a message acknowledgement response (AAI_MSG-ACK) or acknowledgement response extended header (ACK EH) indicating the success or failure of receiving the message itself, and for this purpose, a carrier management indication (AAI_CM-IND) message may be used. A value of the activation deadline field may be expressed in the superframe unit, and it may be a value in which a superframe number is expressed with a predetermined bit (for example, the least significant 6-bit of the superframe number).

If the activation deadline is implemented in an activation timer type, then the timing for expiring the relevant timer is indicated or a timer value may be set. A value of the activation deadline may be differently set according to whether 1) ranging is required, or 2) SFH update according to a superframe header (SFH) change count is required for the activation of a carrier (hereinafter, referred to as a "target carrier") for which its activation is indicated through the AAI_CM-CMD message. If used as a CM ACK available time, this value means a time capable of transmitting an ACK message after AMS receives a secondary carrier management message.

Ranging indicator: Whether periodic ranging is required for the target carrier may be indicated by 1 bit. If the indicator is set to "1" to be transmitted, then it may be preferable that the terminal completes both ranging and activation for the target carrier prior to transmitting an AAI_CM-IND message. On the contrary, if the indicator is set to "0", then the terminal may transmit an AAI_CM-IND message with only the activation complete of the target carrier.

Number of target carrier: Indicate the number of secondary carriers activated/de-activated through the relevant message.

According to the present disclosure, there is provided a method of allowing the terminal (AMS) in a multicarrier (MC) mode (for example, basic MC mode, carrier aggregation mode, carrier switching mode) to transmit feedback information (CQI, MIMO feedback, HARQ ACK/NACK) for a secondary carrier (for example, assigned carrier or active carrier).

First Embodiment

According to a first embodiment, there is provided a method of implicitly notifying a carrier to which its feedback channel for data transmitted and/or received through a downlink (DL) carrier is assigned to the terminal in a multicarrier system.

The feedback channel for a DL carrier in a multicarrier system may be assigned through Feedback Allocation A-MAP IE as defined in a single carrier.

Here, the feedback channel refers to a HARQ feedback channel for HARQ ACK/NACK with respect to data transmitted and/or received through a fastfeedback channel or downlink of a secondary carrier.

When a DL carrier is an active carrier regardless whether the uplink of a carrier (hereinafter, referred to as the "corresponding carrier") for which its feedback channel for the DL carrier is assigned is an active carrier or inactive carrier, the base station assigns a UL feedback channel to the DL carrier by transmitting Feedback Allocation A-MAP IE through a downlink map (DL A-MAP) message transmitted to the corresponding carrier.

Here, even when the corresponding carrier is a DL only activated carrier, the base station transmits Feedback Allocation A-MAP IE to the terminal through the DL A-MAP of the corresponding carrier (i.e., DL only activated secondary carrier).

First, a method of transmitting feedback information on the downlink of a both DL/UL activated secondary carrier will be described.

Figure 4:
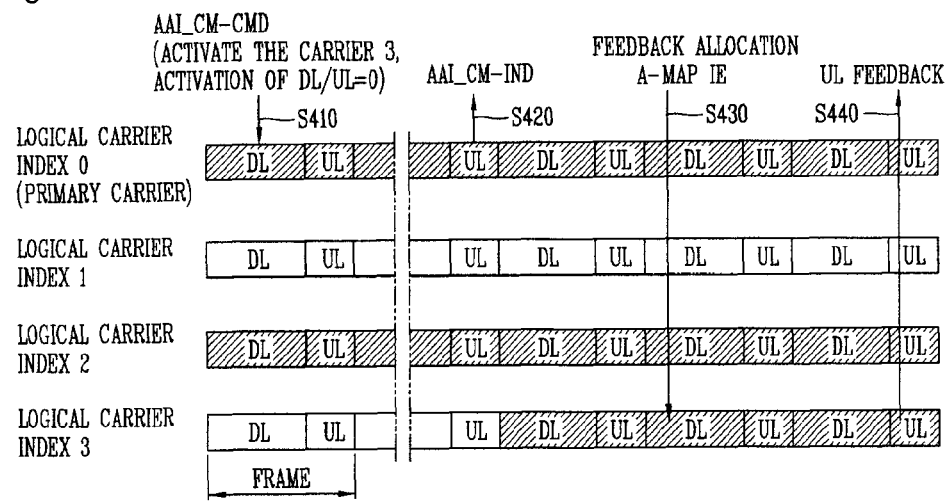
FIG. 4 is a view illustrating a method of transmitting feedback information on the downlink of a both DL/UL activated secondary carrier when receiving a CM-CMD message indicating both the DL/UL activation of a specific secondary carrier according to an embodiment of the present disclosure.

FIG. 4 is a view illustrating a method of transmitting feedback information on the downlink of a both DL/UL activated secondary carrier when receiving a CM-CMD message indicating both the DL/UL activation of a specific secondary carrier according to a first embodiment of the present disclosure.

It is assumed that the terminal is able to transmit and/or receive control information and data to and/or from the base station through a primary carrier mapped to logical carrier index (LCI) 0 and three secondary carriers mapped to logical carrier index (LCI) 1, 2, and 3, respectively.

Here, LCI refers to a carrier indicated by the index. Here, the primary carrier and secondary carrier may be designated by a physical carrier index (PCI) as well as LCI, respectively.

As illustrated in FIG. 4, the base station indicates the activation of LCI 3, and transmits a CM-CMD message indicating the activation of both DL/UL of the LCI 3 to the terminal through a primary carrier (S410).

Furthermore, only LCI 2 is in an activated state among the secondary carriers of the terminal prior to transmitting the CM-CMD message to the terminal.

The terminal activates LCI 3 according to the received CM-CMD message. Here, the terminal activates both UL/DL of the LCI 3.

The terminal transmits a CM-CMD message indicating that the activation of the LCI 3 has been prepared to the base station through a primary carrier (S420).

Next, when the terminal receives Feedback Allocation A-MAP IE through the LCI 3 from the base station (S430), the terminal transmits feedback information on the downlink of the LCI 3 to the base station through a UL feedback channel of the LCI 3 (S440).

In other words, upon receiving Feedback Allocation A-MAP IE from the base station, the terminal transmits feedback information on the downlink of the corresponding secondary carrier through a UL feedback channel assigned by the Feedback Allocation A-MAP IE on the uplink of the corresponding secondary carrier.

Hereinafter, when the terminal receives Feedback Allocation A-MAP IE through a DL only activated secondary carrier, a method of transmitting the feedback information of the DL only activated secondary carrier will be described in detail.

In this case, the terminal interprets a UL feedback channel assigned by Feedback Allocation A-MAP IE received through a DL only activated secondary carrier as a UL feedback channel of the primary carrier. It is because the uplink of the secondary carrier is deactivated, and thus feedback information cannot be transmitted to the base station through the secondary carrier.

In other words, the terminal transmits feedback information on the DL only activated secondary carrier to the base station through a UL feedback channel of the primary carrier.

In other words, the terminal recognizes a UL feedback channel index included in Feedback Allocation A-MAP IE received through the DL only activated carrier as a channel index for a UL feedback channel of the primary carrier.

Accordingly, the terminal transmits feedback information on the secondary carrier through a UL feedback channel of the primary carrier when the secondary carrier is activated only for the downlink.

Here, the base station and the terminal know each other whether a carrier to which its feedback channel for a downlink (DL) carrier is assigned is a DL only activated carrier through a carrier management command (AAI_CM-CMD) message.

In other words, the base station and the terminal know whether a carrier to which its feedback channel for a DL carrier is assigned is a DL only activated carrier through the activation of DL/UL and deactivation of DL/UL fields included in the CM-CMD message.

Accordingly, upon receiving Feedback Allocation A-MAP IE through the DL only activated secondary carrier, the terminal may know whether a UL feedback channel assigned by the Feedback Allocation A-MAP IE received from the base station is an allocation for a UL control channel of a carrier to which its feedback channel of the DL carrier is assigned or an allocation for a UL control channel of the primary carrier.

1. In case where a both DL/UL activated secondary carrier becomes a DL only activated carrier by a CM-CMD message When Feedback Allocation A-MAP IE is transmitted from the base station through the A-MAP of the secondary carrier to transmit feedback information on the downlink of a both DL/UL activated secondary carrier, a UL feedback channel assigned to the Feedback Allocation A-MAP IE means an allocation for the UL feedback channel of the secondary carrier.

However, when an AAI_CM-CMD message for deactivating the UL of a both DL/UL activated secondary carrier is transmitted from the base station, the base station newly assigns a feedback channel for the secondary carrier.

Here, the base station assigns a feedback channel for an uplink deactivated secondary carrier to a UL fastfeedback channel of the primary carrier.

Figure 5:
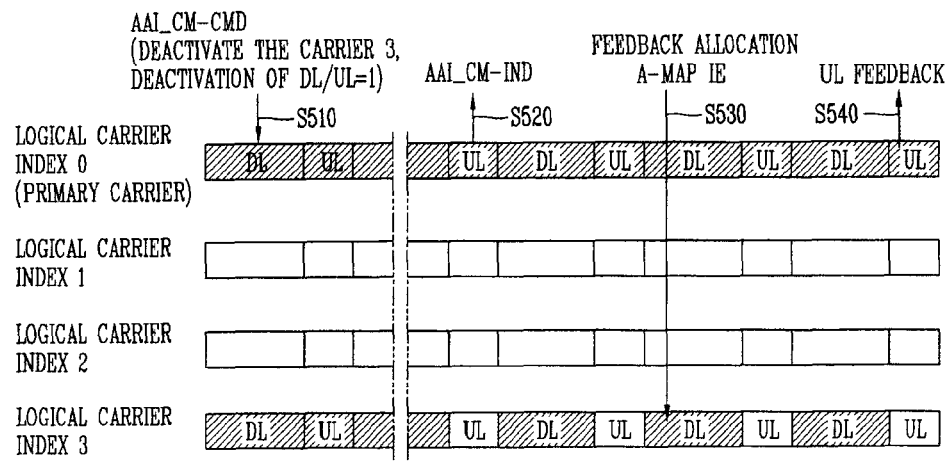
FIG. 5 is a view illustrating a method of transmitting the downlink feedback information of a DL only activated carrier when a both DL/UL activated secondary carrier becomes a DL only activated carrier by a CM-CMD message according to an embodiment of the present disclosure.

FIG. 5 is a view illustrating a method of transmitting the downlink feedback information of a DL only activated carrier when a both DL/UL activated secondary carrier becomes a DL only activated carrier by a CM-CMD message according to a first embodiment of the present disclosure.

Similarly to FIG. 4, a primary carrier is mapped to LCI 0, and each secondary carrier is mapped to LCI 1, 2, and 3.

Referring to FIG. 5, the terminal receives a CM-CMD message indicating that only the uplink of LCI 3 is deactivated through LCI 0 (primary carrier) (S510). In this case, the terminal deactivates the uplink of LCI 3 according to the received CM-CMD message, and transmits a CM-IND message for notifying that the deactivation has been completed to the base station through LCI 0 (S520).

If Feedback Allocation A-MAP IE is received from the base station through the downlink activated LCI 3 (S530), then the terminal transmits feedback information on the downlink of the LCI 3 through a UL feedback channel of LCI 0 (primary carrier) (S540).

2. In case where the corresponding corresponding secondary carrier is a DL only activated carrier If a secondary carrier (corresponding secondary carrier) to which its feedback channel for the secondary carrier is assigned is activated to transmit feedback information on the downlink of the secondary carrier, then the terminal transmits feedback information on the downlink of the secondary carrier through a UL feedback channel of the primary carrier.

In other words, if Feedback Allocation A-MAP IE is transmitted over the relevant DL only activated secondary carrier to provide feedback for the downlink of a secondary carrier, then a feedback channel index included in the Feedback Allocation A-MAP IE means an allocation for a UL feedback channel of the primary carrier.

Here, if the uplink of the DL only activated secondary carrier is activated by a CM-CMD message transmitted from the base station while feedback information on the corresponding carrier (i.e., DL only activated carrier) is transmitted through a primary carrier, then the base station may newly assign a UL feedback channel for the DL only activated secondary carrier to the terminal while at the same time the uplink is activated.

Here, the newly assigned UL feedback channel represents an allocation for a UL control channel of the DL only activated secondary carrier.

The terminal transmits feedback information on the DL carrier through a UL feedback channel of the previously assigned primary carrier until the UL feedback channel is newly assigned.

Figure 6:
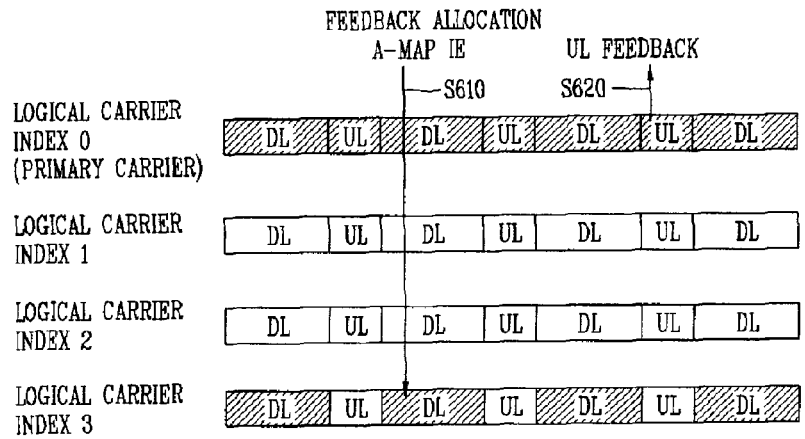
FIG. 6 is a view illustrating a method of transmitting the downlink feedback information of a DL only activated carrier according to an embodiment of the present disclosure.

FIG. 6 is a view illustrating a method of transmitting the downlink feedback information of a DL only activated carrier according to an embodiment of the present disclosure.

Similarly to FIG. 4, a primary carrier is mapped to LCI 0, and each secondary carrier is mapped to LCI 1, 2, and 3.

Referring to FIG. 6, if the terminal receives Feedback Allocation A-MAP IE from the base station through DL only activated LCI 3 (S610), then the terminal transmits feedback information on the downlink of the LCI 3 through a UL feedback channel of LCI 0 (primary carrier) (S620).

Second Embodiment

According to a second embodiment, there is provided a method of explicitly notifying a carrier to which the feedback channel of a downlink secondary carrier is assigned using a carrier indication bit of the Feedback Allocation A-MAP IE in a multicarrier system.

In other words, the base station transmits a carrier indication field indicating a carrier to which the feedback channel of the corresponding secondary carrier is assigned to the terminal by including it in the Feedback Allocation A-MAP IE. Here, the corresponding secondary carrier refers to a secondary carrier for receiving Feedback Allocation A-MAP IE.

Accordingly, the terminal transmits feedback information on the downlink of the corresponding secondary carrier to the base station through a UL feedback channel of a carrier indicated by the carrier indication field. Here, the UL feedback channel is assigned by the Feedback Allocation A-MAP IE.

An example of Feedback Allocation A-MAP IE (FA A-MAP IE) including a carrier indication field according to an embodiment of the present disclosure is illustrated in the following Table 1.

TABLE 1

| Field | Size | Description | Condition |
| --- | --- | --- | --- |
| carrier indication | 1 | 1: Allocation(Assigned) to the feedback channel of a primary carrier 0: Allocation(Assigned) to the feedback channel of a secondary carrier on which feedback allocation IE is transmitted | When DL/UL of secondary carrier are all activated, carrier indication is 0 or 1. When DL of secondary carrier is only activated, carrier indication is always 1. |

Referring to Table 1, a carrier indication field indicates whether feedback information on the downlink of a secondary carrier on which Feedback Allocation A-MAP IE is transmitted is assigned to a UL feedback channel of the primary carrier or assigned to a UL feedback channel of the secondary carrier that has received the FA A-MAP IE.

For example, if the carrier indication field is set to "1", then the terminal transmits feedback information on the downlink of the corresponding secondary carrier through a UL feedback channel of the primary carrier.

Furthermore, if the carrier indication field is set to "0", then the terminal transmits feedback information on the downlink of the corresponding secondary carrier through a UL feedback channel of the secondary carrier (i.e., a secondary carrier on which Feedback Allocation A-MAP IE is transmitted).

Here, the carrier indication field may be set to a "0" or "1" only if both DL/UL of the corresponding secondary carrier are activated, and the carrier indication field is always set to "1" if the corresponding secondary carrier is a DL only activated carrier.

In other words, if the corresponding secondary carrier is a DL only activated carrier, then Feedback Allocation A-MAP IE is transmitted through the DL A-MAP of the corresponding secondary carrier, but the feed back of the corresponding secondary carrier is transmitted to the base station through a UL feedback channel of the primary carrier.

Furthermore, the foregoing description will be applicable when assigning HFBCH for HARQ ACK/NACK as well as when assigning FFBCH.

Figure 7:
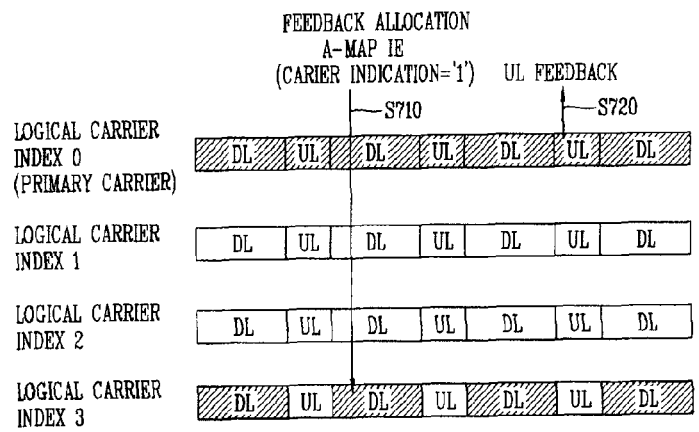
FIG. 7A is a view illustrating a method of transmitting feedback information through a primary carrier when a carrier indication field is set to "1" according to a second embodiment of the present disclosure.
FIG. 7B is a view illustrating a method of transmitting feedback information through the corresponding secondary carrier when a carrier indication field is set to "0".
Figure 7:
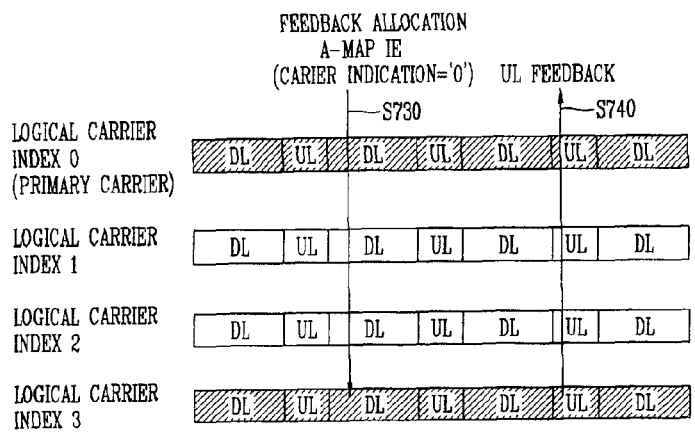

FIG. 7A is a view illustrating a method of transmitting feedback information through a primary carrier when a carrier indication field is set to "1" according to a second embodiment of the present disclosure, and FIG. 7B is a view illustrating a method of transmitting feedback information through the corresponding secondary carrier when a carrier indication field is set to "0".

Referring to FIG. 7A, if the terminal receives Feedback Allocation A-MAP IE in which the carrier indication field is set to "1" through a secondary carrier mapped to LCI 3 from the base station (S710), then the terminal transmits the feedback information of the secondary carrier of LCI 3 through a UL feedback channel of the primary carrier of the LCI 0 (S720).

Referring to FIG. 7B, if the terminal receives Feedback Allocation A-MAP IE in which the carrier indication field is set to "0" through a secondary carrier mapped to LCI 3 from the base station (S730), then the terminal transmits the feedback information of the secondary carrier of LCI 3 through a UL feedback channel of the secondary carrier of the LCI 3 (S740).

Third Embodiment

According to a third embodiment, there is provided a method of explicitly notifying a carrier to which the feedback channel of a DL secondary carrier is assigned by including a feedback carrier index in an AAI_CM-CMD message to transmit to the terminal.

The base station transmits a MAC control message such as carrier management command (AAI_CM-CMD) message to the terminal in a multicarrier (MC) mode, thereby indicating the activation or deactivation of a secondary carrier.

Here, the base station may indicate to activate both the downlink and uplink of a secondary carrier or activate only the downlink thereof, and otherwise, the base station may indicate to deactivate both the downlink and uplink of a secondary carrier or de-activate only the uplink thereof and maintain the activation of the downlink thereof.

In this case, the terminal may have a secondary carrier, which is a DL unpaired carrier, through the received CM-CMD message. In other words, the terminal may have a DL only activated secondary carrier.

Accordingly, when transmitting a CM-CMD message indicating a specific secondary carrier as a DL only activated carrier or DL/UL deactivated carrier to the terminal, the base station transmits a feedback carrier index field indicating a feedback carrier for transmitting the feedback information of the specific secondary carrier by including it in the CM-CMD message.

An example of the format of an AAI_CM-CMD message according to a third embodiment is illustrated in the following Table 2.

TABLE 2

| Field | Size(bit) | Description |
|---|---|---|
| AAI_Carrier Management Command message format( ){ | | |
| Control Message Type | 8 | AAI_CM-CMD |
| Action code | 1 | 0: Secondary carrier management<br>1: Primary carrier change |
| If (Action code == 0){ | | This message is for secondary carrier activation and/or deactivation |
| Indication Type | 2 | For Activation and/or Deactivation<br>Bit #0: '0' No action, '1' Activation<br>Bit #1: '0' No action, '1' Deactivation |
| If (Indication Type #0 == 1) | | |
| Num of target carrier<br>For(i=0; i< Num of target carrier; i++){ | 3 | The number of newly activated carrier(s) |
| Target carrier index | 3 | Target carrier index for activation |
| Activation of DL/UL | 1 | '0' Both DL/UL are activated<br>'1' DL is activated but UL is not activated |
| If (Activation of DL/UL == 1){ | | |
| Feedback Carrier Index | 3 | Logical carrier index for UL feedback channel<br>This shall be one of AMS's active carrier(s). It may be primary carrier of an AMS. |
| } | | |
| Ranging indicator | 1 | Ranging indicator for target carrier<br>'0' No ranging is required for the target carrier<br>'1' Periodic ranging is required for the target carrier |
| }<br>}<br>If (Indication Type #1 == 1){ | | |
| Num of target carrier<br>For(i=0; i< Num of target carrier; i++){ | 3 | The number of deactivated carrier(s) |
| Target carrier index | 3 | Target carrier index for deactivation |

TABLE 2-continued

| Field | Size(bit) | Description |
|---|---|---|
| Deactivation of DL/UL | 1 | '0' Both DL/UL are deactivated<br>'1' UL is deactivated but DL is kept active |
| Feedback Carrier FLAG | 1 | Feedback Carrier Index presence indicator,<br>'0' not present<br>'1' present.<br>If the Deactivation of DL/UL is set to '1' this value shall be always set to '1'<br>If the target carrier is both DL/UL activated carrier and has been linked to any unpaired DL carrier, Feedback Carrier for the linked DL carrier is updated to the following Feedback Carrier Index. In this case, this flag shall be set to '1' |
| If (Feedback Carrier FLAG == 1){ | | |
| Feedback Carrier Index | 3 | Logical carrier index for UL feedback channel<br>This shall be one of AMS's active carrier(s). It may be primary carrier of an AMS. |
| }<br>  }<br>  }<br>} | | |
| If (Action code == 1){ | | This message is for primary carrier change. |
| Physical carrier index of Target carrier | 6 | Physical carrier index of target carrier for primary carrier change<br>If the AMS supports multicarrier operation, the carrier shall be one of the assigned carriers. |
| Action Time | 3 | LSB bits of Superframe number at the time to switch to the target carrier.<br>This value shall be set to the value more than the retransmission timer for AAI_CM-CMD message |
| Next state of serving primary carrier | 1 | '0' Serving carrier will be deactivated after primary carrier change. If the AMS does not support carrier aggregation, this field shall be always set to '0'<br>'1' Serving carrier is kept active after primary carrier change |
| Ranging indicator | 1 | Ranging indicator for target carrier<br>'0' No ranging is required for the target carrier<br>'1' Periodic ranging is required for the target carrier |
| }<br>} | | |

Referring to Table 2, if an activation of DL/UL field is set to "1" (i.e., if it is indicated that only the downlink of a secondary carrier indicating activation is activated), then the CM-CMD message includes a feedback carrier index field indicating a carrier to which the feedback channel of the DL only activated secondary carrier is assigned.

The feedback carrier index field indicates a logical carrier index or physical carrier index to which a UL feedback channel is assigned.

Furthermore, a feedback carrier indicated by the feedback carrier index corresponds to one of active carriers of the terminal, and the feedback carrier may be a primary carrier of the terminal.

Furthermore, the CM-CMD message includes a feedback carrier flag indicating whether or not there exists a feedback carrier index.

As an example, it indicates that the feedback carrier index is not included in the CM-CMD message if a feedback carrier flag is set to "0", and indicates that the feedback carrier index is included in the CM-CMD message if a feedback carrier flag is set to "1".

Here, if a deactivation of DL/UL field included in the CM-CMD message is set to "1" (i.e., when indicating that the uplink of a secondary carrier indicating deactivation is deactivated, and the activation of the downlink is maintained), the feedback carrier flag is always set to "1".

Furthermore, if a target carrier indicated with deactivation is a both DL/UL activated carrier, and is linked to any unpaired DL carrier (DL only activated carrier), then a feedback carrier for the linked DL carrier is updated to a value indicated in the feedback carrier index field (a feedback carrier index field included therein when a feedback carrier flag is set to "1"). In this case, the feedback carrier flag will be set to "1".

In other words, if the feedback carrier flag is set to "1", then the CM-CMD message includes a feedback carrier index field indicating a carrier to which a UL feedback channel is assigned. In this case, the feedback carrier index may be a logical carrier index or physical carrier index.

Furthermore, the feedback carrier corresponds to one of active carriers of the terminal, which may be a primary carrier.

Hereinafter, a method of transmitting the feedback information of a DL only activated secondary carrier to the base station through a carrier indicated by the feedback carrier index field will be described in detail with reference to the drawing.

If the base station indicates that a secondary carrier of the terminal becomes a DL only activated carrier through a CM-CMD message, then a feedback carrier index field indicating an index of the carrier to which the UL feedback channel for a target DL only activated carrier is assigned is transmitted to the terminal by including it in the CM-CMD message.

Here, the feedback carrier index field may be included in another MAC control message in addition to an AAI_CM-CMD message to be transmitted.

In other words, if the base station instructs the terminal to activate only the downlink of a secondary carrier, then the base station transmits a feedback carrier index indicating a carrier to which a feedback channel for the secondary carrier is assigned to the terminal by including it in a CM-CMD message.

1. Method of Transmitting Feedback Information on the Downlink of a DL Activated but UL Deactivated Secondary Carrier The first method is a method of transmitting the feedback information of a downlink only activated secondary carrier through a secondary carrier indicated by a feedback carrier index when the activation of a specific secondary carrier is indicated by a CM-CMD message transmitted from the base station but only the activation of the downlink thereof is indicated.

Figure 8:
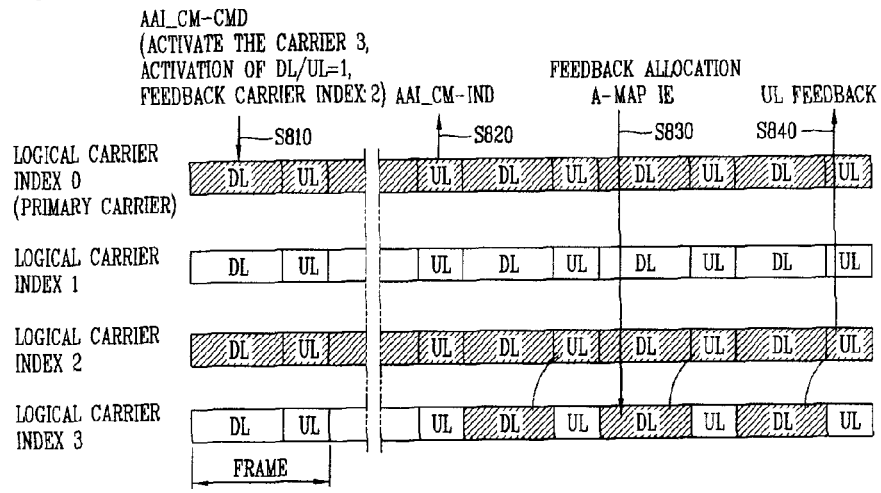
FIG. 8 is a view illustrating a method of transmitting the downlink feedback information of a secondary carrier according to a first method of the third embodiment of the present disclosure.

FIG. 8 is a view illustrating a method of transmitting the downlink feedback information of a secondary carrier according to a first method of the third embodiment of the present disclosure.

First, it is assumed that the terminal may transmit and/or receive control information and data to and/or from the base station through a primary carrier mapped to a logical carrier index (LCI) 0 and three secondary carriers mapped to logical carrier index (LCI) 1, 2, and 3, respectively.

Here, LCI refers to a carrier indicated by the index. Here, the primary carrier and secondary carrier may be referred to by a physical carrier index (PCI) as well as each LCI.

Referring to FIG. 8, secondary carriers corresponding to LCI 1 and 3 are in an inactive state prior to receiving a CM-CMD message from the base station.

The base station instructs the terminal to activate a secondary carrier corresponding to LCI 3 through a primary carrier, and transmits a CM-CMD message indicating the downlink of the secondary carrier to be activated and the uplink thereof to be de-activated to the terminal (S810).

In this case, since the uplink of the LCI 3 is deactivated, the CM-CMD message includes a feedback carrier index indicating a feedback carrier to which the downlink feedback channel of the LCI 3 is assigned.

Referring to FIG. 8, it is seen that the feedback carrier index indicates LCI 2.

Here, the terminal activates only the downlink of LCI 3 according to the CM-CMD message, and transmits a CM-IND message notifying that the activation preparation has been completed to the base station through a primary carrier (S820).

Next, upon receiving Feedback Allocation A-MAP IE through a DL only activated LCI 3 (S830), the terminal transmits feedback information on the LCI 3 to the base station through a UL feedback channel of LCI 2 indicated by a feedback carrier index (S840).

2. Method of Transmitting Feedback Information on the Downlink of a UL Activated but DL Deactivated Secondary Carrier The second method is a method of transmitting the feedback information of the downlink only activated secondary carrier through a secondary carrier indicated by a feedback carrier index when the deactivation of a specific secondary carrier is indicated by a CM-CMD message transmitted from the base station but only the deactivation of the downlink thereof is indicated.

In this case, the CM-CMD message may further include a feedback carrier flag field indicating whether there exists a feedback carrier index field.

Figure 9:
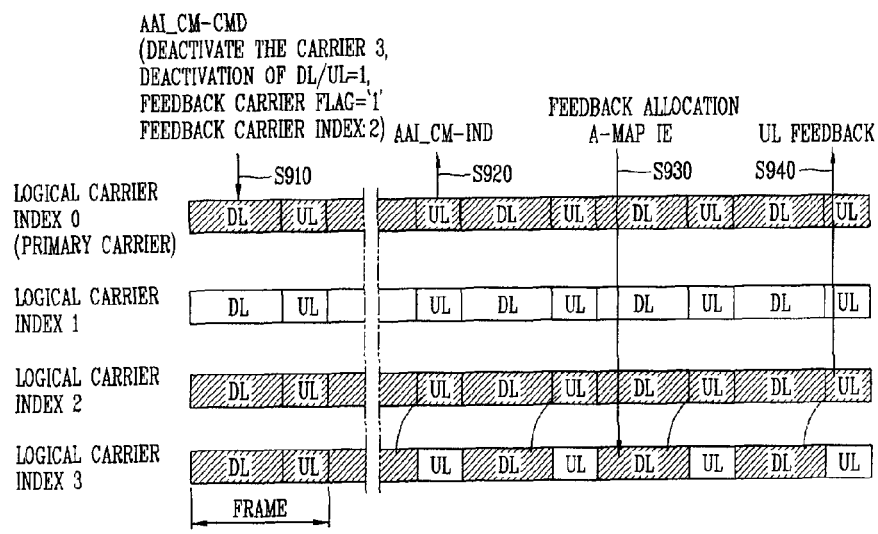
FIG. 9 is a view illustrating a method of transmitting the downlink feedback information of a secondary carrier according to a second method of the third embodiment of the present disclosure.

FIG. 9 is a view illustrating a method of transmitting the downlink feedback information of a secondary carrier according to a second method of the third embodiment of the present disclosure.

Similarly to FIG. 8, a primary carrier is mapped to LCI 0, and each secondary carrier is mapped to LCI 1, 2, and 3, respectively.

The base station instructs the terminal to deactivate LCI 3 through a primary carrier, and transmits a CM-CMD message indicating the uplink of the LCI 3 to be deactivated and the downlink thereof not to be deactivated to the terminal (S910).

In this case, the CM-CMD message may further include a feedback carrier flag field indicating whether a feedback carrier index is included therein, and may further include a feedback carrier index field according to a value indicated by the feedback carrier flag field.

Referring to FIG. 9, it is seen that the feedback carrier flag is set to "1" (i.e., indicating that a feedback carrier index is included therein), and a feedback carrier through which downlink feedback information of LCI 3 indicated with deactivation is transmitted is LCI 2 indicated by a feedback carrier index.

The terminal deactivates only the uplink of LCI 3 according to the received CM-CMD message, and transmits a CM-IND message notifying that the deactivation preparation of the uplink of the LCI 3 has been completed to the base station through a primary carrier (S920).

Next, upon receiving Feedback Allocation A-MAP IE through a DL only activated LCI 3 (S930), the terminal transmits feedback information on the LCI 3 to the base station through a UL feedback channel of the secondary carrier LCI 2 (S940).

3. Method for Updating Feedback Channel for an Unpaired Carrier

The third method is a method of transmitting the downlink feedback information of any unpaired carrier through a feedback carrier indicated by a feedback carrier index included in a CM-CMD message when the deactivation of a specific secondary carrier is indicated by the CM-CMD message transmitted from the base station, but only a linkage of the UL of the deactivated secondary carrier and the DL of the any unpaired carrier is configured.

In other words, there is provided a method of updating a feedback channel of the any unpaired carrier with a feedback channel of the carrier indicated by a feedback carrier index included in the CM-CMD message.

In this case, the CM-CMD message may further include a feedback carrier flag field indicating whether there exists a feedback carrier index field.

Figure 10:
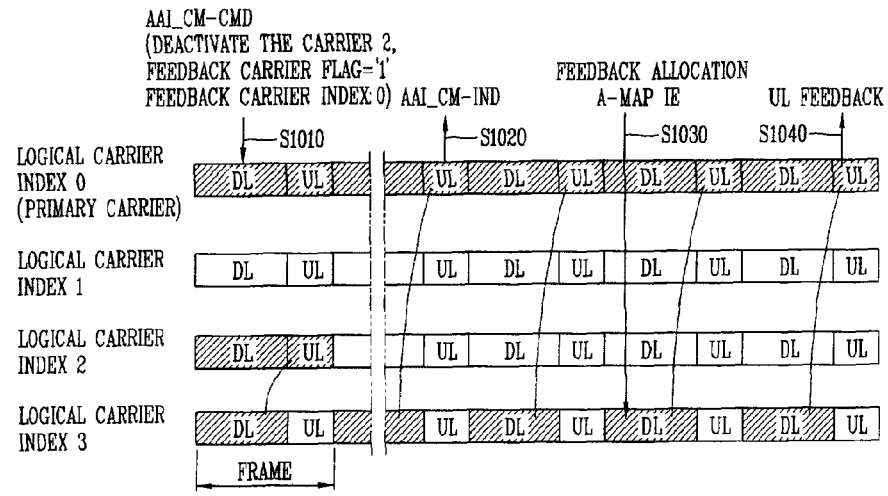
FIG. 10 is a view illustrating a method of transmitting the downlink feedback information of a secondary carrier according to a third method of the third embodiment of the present disclosure.

FIG. 10 is a view illustrating a method of transmitting the downlink feedback information of a secondary carrier according to a third method of the third embodiment of the present disclosure.

Similarly to FIG. 8, a primary carrier is mapped to LCI 0, and each secondary carrier is mapped to LCI 1, 2, and 3, respectively.

As illustrated in FIG. 10, the secondary carrier corresponding to LCI 1 is in a de-activated state, the secondary carrier corresponding to LCI 2 is in a both DL/UL activated state, and the secondary carrier corresponding to LCI 3 is in a DL only activated state prior to receiving a CM-CMD message from the base station.

Furthermore, it is seen that the downlink of LCI 3 and the uplink of LCI 2 are configured with a linkage.

If the base station transmits a CM-CMD message indicating the deactivation of LCI 2 through a primary carrier, then the CM-CMD message includes a feedback carrier flag field indicating that a feedback carrier index is included therein (i.e., a feedback carrier flag field is set to "1"), and includes a feedback carrier index field indicating a feedback carrier for the downlink feedback information transmission of the LCI 3 to perform update to a feedback channel for the downlink of the LCI 3 (S1010).

As illustrated in FIG. 10, the feedback carrier index indicates a primary carrier for which the feedback carrier index is LCI 0.

Since LCI 2 configured with a linkage with the DL of LCI 3 is deactivated by a CM-CMD message received from the base station, the terminal updates a feedback channel for the downlink of the LCI 3 to a feedback channel of the feedback carrier indicated by a feedback carrier index included in the CM-CMD message.

Upon receiving Feedback Allocation A-MAP IE through the LCI 3 (S1030), the terminal transmits the downlink feedback information of the LCI 3 to the base station through a UL feedback channel of a primary carrier (LCI 0) indicated by a feedback carrier index included in the CM-CMD message (S1040).

In other words, the terminal transmits the feedback information of the LCI 3 to the base station through LCI 0 (primary carrier) indicated by the feedback carrier index.

Furthermore, the terminal deactivates LCI 2 according to the CM-CMD message, and transmits a CM-IND message notifying that the deactivation of the LCI 2 has been prepared to the base station through a primary carrier (S1020).

As described in the present disclosure, if a carrier that has transmitted UL feedback information is deactivated while transmitting the UL feedback information for a DL only activated carrier through another assigned carrier (primary carrier or secondary carrier), then the UL feedback channel that has been assigned to a UL feedback region of the corresponding carrier is automatically deallocated.

In this case, it is preferable that the base station newly assigns a UL feedback channel for the corresponding carrier through A-MAP.

Hereinafter, according to still another embodiment of the present disclosure, a method for transmitting CINR or CQI (feedback information on a DL carrier) for an inactive carrier will be described.

CINR Report for an Inactive Carrier

The terminal may be able to allow a CINR report for an inactive carrier through the following scheme among the carriers assigned by the base station.

1. Use of a MAC level message: Define a MAC control message/extended header for the DL CINR reporting of multiple carriers.

2. Definition of Feedback Allocation A-MAP IE for assigned carriers: The base station may indicate an inactive carrier that requires CINR reporting during the network entry or secondary carrier assignment of the terminal.

Furthermore, the base station may indicate a CINR reporting that requires a carrier to the terminal through a multicarrier response (AAI_MC-RSP) message.

Definition of a MAC Control Message/EH for the DL CINR Reporting of Multiple Secondary Carrier(s)

A CINR reporting type MAC control message is defined, and the terminal may report CINR to the base station by transmitting an unsolicited MAC control message (through BR) or extended header (EH) in MAC PDU transmitted to the base station (in a piggyback type).

The message for the foregoing CINR reporting may include the followings, for example, but it will not be limited to them.

1-(1) DL CINR report extended header (DL CINR EH)
1-(2) DL CINR Report control message (AAI_CINR-REP)
1-(3) Use of the existing MAC control message (AAI_CM-IND or AAI_SCN-REP or the like)

The foregoing MAC control message or EH may include a CINR value for one or more target secondary carrier(s) and the corresponding carrier.

Number of DL Carrier
 For (i=0; I<Number of DL carrier; i++){
 DL carrier index (logical carrier index or physical carrier index)
 CINR}

Here, the terminal selects a carrier for reporting CINR at its discretion, and then reports it to the base station, or indicates an index of the carrier for which its channel state should be monitored when the base station assigns an assigned carrier to the terminal, and in this case, the following messages may be used.

2-(1) AAI_MC-RSP message: Indicate while assigning an assigned carrier.
2-(2) AAI_CM-CMD message: An action for CINR reporting may be added by adding an action code.
2-(3) Definition of a new extended header (EH) or control message: (Explicitly) indicate by defining a DL_CINR_REQ_EH or DL CINR REQ control message.

DL CINR Report Extended Header (DL CINR EH)

DL_CINR_EH may be transmitted periodically or in an event-triggered manner by the terminal.

Here, if the terminal has UL data to be transmitted to the base station, then it will be transmitted through EH, and otherwise it will be transmitted through a control message.

A DL carrier transmitted in the DL_CINR_EH may be selected by the base station, and may be selected by the terminal at its discretion to be transmitted.

TABLE 3

| Syntax | Size (bits) | Notes |
|---|---|---|
| DL_CINR_EH( ){ | | |
| Extended Header Type | 4 | DL CINR REPORT Extended Header |
| Number of DL carrier(s) | [3] | The number of DL carriers which an AMS reports CINR value(s). |
| for (i=0; i< Number of carrier; i++){ | | |
| logical carrier index of DL carrier | [6] | DL carrier index which an AMS reports CINR value. This value refers to logical carrier index. |
| CINR | [7] | This value indicates the CINR measured by the AMS from the ABS. |
| } | | |
| reserved | variables | Reserved for byte alignment. |
| } | | |

DL CINR Report Control Message (AAI CINR-REP)

This message may be transmitted periodically or in an event-triggered manner by the terminal.

Similarly, here, if the terminal has UL data to be transmitted to the base station, then it will be transmitted through EH, and otherwise it will be transmitted through a control message.

A DL carrier transmitted in this message may be selected by the base station, and may be selected by the terminal at its discretion to be transmitted.

TABLE 4

| Syntax | Size (bits) | Notes |
|---|---|---|
| AAI_CINR-REP( ){ | | |
| MAC Control Message type | 8 | DL CINR REPORT control message |
| Number of DL carrier(s) | [3] | The number of DL carriers which an AMS reports CINR value(s). |
| for (i=0; i< Number of carrier; i++){ | | |
| logical carrier index of DL carrier | [6] | DL carrier index which an AMS reports CINR value. This value refers to logical carrier index. |
| CINR | [7] | This value indicates the CINR measured by the AMS from the ABS. |
| } | | |
| reserved | variables | Reserved for byte alignment. |
| } | | |

Use of the Existing MAC Control Message (AAI CM-IND or AAI SCN-REP or the Like)

A case where the AAI_CM-IND message is used as a message for DL CINR reporting is illustrated in the following Table 5.

TABLE 5

| Syntax | Size (bits) | Notes |
|---|---|---|
| AAI_CM-IND( ){ | | |
| MAC Control Message type | 8 | AAI_CM-IND control message |
| Action code | 2 | 0b00: secondary carrier activation/deactivation<br>0b01: primary carrier change<br>0b10: DL CINR reporting<br>0b11: reserved |
| If (action code == 0b10){ | | For DL CINR reporting |
| Number of DL carrier(s) | [3] | The number of DL carriers which an AMS reports CINR value(s). |
| for (i=0; i< Number of carrier; i++){ | | |
| DL carrier index | [6] | Index of DL carrier measured by AMS. This value refers to logical carrier index. |
| CINR | [7] | This value indicates the CINR measured by the AMS from the ABS. |
| } | | |
| } | | |
| reserved | variables | Reserved for byte alignment. |
| } | | |

Definition of Feedback Allocation A-MAP IE for an Assigned Carrier

A physical carrier index is always indicated as a first field of Feedback Allocation A-MAP IE.

An example of Feedback Allocation A-MAP IE according to an embodiment of the present disclosure is illustrated in the following Table 6.

TABLE 6

| Syntax | Size (bits) | Notes |
|---|---|---|
| Feedback_Allocation_A-MAP_IE( ){ | | |
| A-MAP IE type | 4 | Feedback Allocation A-MAP IE |
| DL carrier index | 6 | Physical or logical carrier index of DL carrier measured by AMS. |
| Channel index | 6 | Feedback channel index within the UL fast feedback control resource region |
| } | | |
| padding | Variable | Padding to |
| } | | |

The base station may indicate an inactive carrier that requires CINR reporting during the network entry or secondary carrier assignment of the terminal.

An example of the AAI_MC-RSP message format including a field indicating a DL CINR report for an inactive carrier is illustrated in the following Table 7.

TABLE 7

| Field | Size (bits) | Notes |
|---|---|---|
| Management Message Type | 8 | AAI_MC-RSP messasge |
| Number of Assigned Carriers (N) | 3 | Number of Assigned Secondary Carriers. |
| For (i=0; i<N; i++) { | | |
| Physical carrier index | 6 | The index refers to a Physical carrier index in AAI_MC-ADV message |
| Support of data transmission over guard sub-carrier | 1 | 0 = not support<br>1 = support |
| Need to DL CINR report | 1 | 0 = The AMS doesn't need to report the DL CINR<br>1 = The AMS periodically reports the CINR for this DL carrier to ABS although this carrier is inactive. |
| } | | |

Figure 11:
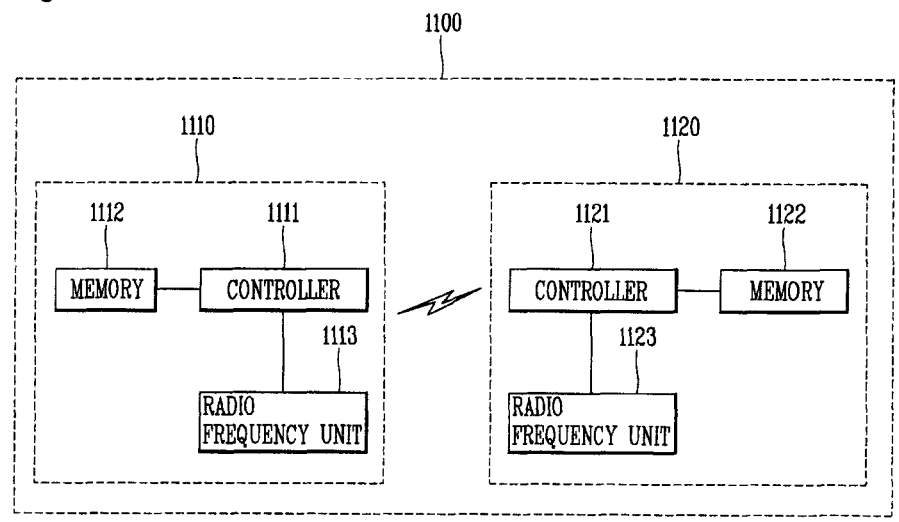
FIG. 11 is a block diagram illustrating a wireless communication system according to an embodiment of the present disclosure.

FIG. 11 is a block diagram illustrating a wireless communication system according to an embodiment of the present disclosure.

The base station 1110 may include a controller 1111, a memory 1112, and a radio frequency (RF) unit 1113.

The controller 1111 implements its proposed function, process and/or method. The layers of a radio interface protocol may be implemented by the controller 1111.

The controller 1111 may control the feedback information of a DL only activated secondary carrier to be transmitted through a UL feedback channel of the primary carrier or a feedback carrier indicated by a feedback carrier index.

The memory 1112 is connected to the controller 1111 to store a protocol or parameter for multicarrier management. The RF unit 1113 is connected to the controller 1111 to transmit and/or receive radio signals.

The terminal 1120 may include a controller 1121, a memory 1122, and a radio frequency (RF) unit 1123.

The controller 1121 implements its proposed function, process and/or method. The layers of a radio interface protocol may be implemented by the controller 1121.

The controller 1121 may control the feedback information of a DL only activated secondary carrier to be transmitted through a UL feedback channel of the primary carrier or a feedback carrier indicated by a feedback carrier index.

The memory 1122 is connected to the controller 1121 to store a protocol or parameter for multicarrier management. The RF unit 1123 is connected to the controller 1121 to transmit and/or receive radio signals.

The controller 1111, 1121 may include an application-specific integrated circuit (ASIC), another chip set, a logic circuit and/or a data processing unit. The memory 1112, 1122 may include a read-only memory (ROM), a random access memory (RAM), a flash memory, a memory card, a storage medium and/or another storage unit. The RF unit 1113, 1123 may include a baseband circuit for processing radio signals. When the foregoing embodiment is implemented by software, the foregoing techniques may be implemented by a module (process, function, etc.) performing the foregoing functions. The module may be stored in the memory 1112, 1122, and implemented by the controller 1111, 1121. The memory 1112, 1122 may be located within or out of the controller 1111, 1121, and may be connected to the controller 1111, 1121 by various well-known means.

The invention claimed is:

1. A method for transmitting feedback information for a carrier in a multicarrier system, the method comprising:

receiving a carrier management command message via a primary carrier, the carrier management command message including activation information indicating that downlink of a secondary carrier is activated and indicating whether uplink of the secondary carrier is activated;

receiving a feedback allocation message including a feedback channel index via the downlink of the secondary carrier regardless of whether the uplink of the secondary carrier is activated;

interpreting the feedback channel index as an uplink feedback channel of either the primary carrier or the secondary carrier according to whether the uplink of the secondary carrier is activated; and transmitting the feedback information via the uplink feedback channel of the secondary carrier based on the feedback channel index although the uplink of the primary carrier is activated when the uplink of the secondary carrier is activated; and transmitting the feedback information via the uplink feedback channel of the primary carrier based on the feedback channel index when the uplink of the secondary carrier is deactivated.

2. The method of claim 1, wherein the uplink feedback channel of the primary carrier is located at an uplink region defined in a superframe header transmitted via the primary carrier.

3. The method of claim 1, wherein the feedback allocation message is a feedback allocation a-map information element.

4. The method of claim 1, wherein the secondary carrier is a fully configured carrier.

5. The method of claim 1, wherein the feedback information is a hybrid automatic repeat request (HARQ ACK/NACK) or a carrier to interference-and-noise ratio (CINR) for the secondary carrier.

6. A terminal for transmitting feedback information for a carrier in a multicarrier system, the terminal comprising:

a memory configured to store information;

a radio frequency unit configured to transceive radio signals at least to or from an external entity; and a controller configured to:

control the radio frequency unit to receive a carrier management command message via a primary carrier, the carrier management command message including activation information indicating that downlink of a secondary carrier is activated and indicating whether uplink of the secondary carrier is activated;

control the radio frequency unit to receive a feedback allocation message including a feedback channel index via the downlink of the secondary carrier regardless of whether the uplink of the secondary carrier is activated;

interpret the feedback channel index as an uplink feedback channel of either the primary carrier or the secondary carrier according to whether the uplink of the secondary carrier is activated;

control the radio frequency unit to transmit the feedback information via the uplink feedback channel of the secondary carrier based on the feedback channel index although the uplink of the primary carrier is activated when the uplink of the secondary carrier is activated; and control the radio frequency unit to transmit the feedback information via the uplink feedback channel of the primary carrier based on the feedback channel index when the uplink of the secondary carrier is deactivated.

7. The terminal of claim 6, wherein the uplink feedback channel of the primary carrier is located at an uplink region defined in a superframe header transmitted via the primary carrier.

8. The terminal of claim 6, wherein the feedback allocation message is a feedback allocation a-map information element.

9. The terminal of claim 6, wherein the secondary carrier is a fully configured carrier.

10. The terminal of claim 6, wherein the feedback information is a hybrid automatic repeat request (HARQ ACK/NACK) or a carrier to interference-and-noise ratio (CINR) for the secondary carrier.

* * * * *